United States Patent
Wu et al.

(10) Patent No.: US 9,229,530 B1
(45) Date of Patent: Jan. 5, 2016

(54) WIRELESS HAPTIC FEEDBACK APPARATUS CONFIGURED TO BE MOUNTED ON A HUMAN ARM

(71) Applicants: You Wu, Cambridge, MA (US); Michael James McCoy, Greenwood, IN (US); F. Vinayak, West Lafayette, IN (US); Karthik Ramani, West Lafayette, IN (US); Raja Jasti, Cupertino, CA (US)

(72) Inventors: You Wu, Cambridge, MA (US); Michael James McCoy, Greenwood, IN (US); F. Vinayak, West Lafayette, IN (US); Karthik Ramani, West Lafayette, IN (US); Raja Jasti, Cupertino, CA (US)

( * ) Notice: Subject to any disclaimer, the term of this patent is extended or adjusted under 35 U.S.C. 154(b) by 253 days.

(21) Appl. No.: 13/886,497

(22) Filed: May 3, 2013

Related U.S. Application Data

(60) Provisional application No. 61/643,253, filed on May 5, 2012, provisional application No. 61/671,777, filed on Jul. 15, 2012.

(51) Int. Cl.
*G06F 3/01* (2006.01)
(52) U.S. Cl.
CPC .................................... *G06F 3/016* (2013.01)
(58) Field of Classification Search
None
See application file for complete search history.

(56) References Cited

U.S. PATENT DOCUMENTS

| | | | |
|---|---|---|---|
| 7,138,976 B1 * | 11/2006 | Bouzit et al. | 345/156 |
| 8,004,492 B2 | 8/2011 | Kramer et al. | |
| 8,922,355 B2 * | 12/2014 | Kusuura | 340/407.1 |
| 2010/0134327 A1 * | 6/2010 | Dinh et al. | 341/20 |
| 2010/0290698 A1 | 11/2010 | Freedman et al. | |

OTHER PUBLICATIONS

Aoki, et al., "Wearable Haptic Device to Present Contact Sensation Based on Cutaneous Sensation using Thin Wire", ACE 2009, Oct. 29-31, 2009, pp. 1-8.
Bouzit, et al., "The Rutgers Master II—New Design Force Feedback Glove", IEEE/ASME Trans. on Mechantronics, vol. 7, No. 2, Jun. 2002, pp. 256-263.
Culjat, et al., "Remote Tactile Sensing Glove-Based System", 32$^{nd}$ Annual Int'l conf of IEEE EMBS, Aug. 31-Sep. 4, 2010, pp. 1550-1554.
Frati, et al., "Using Kinect for Hand Tracking and Rendering in Wearable Haptics", IEEE World Haptics Conf. 2011, Jun. 21-24, 2011, pp. 317-321.
Israr, Ali, et al., "Control Space of Apparent Haptic Motion", IEE World Haptics Conference 2011, Jun. 21-24, 2011, pp. 457-462.
Massie, et al., "The PHANToM Haptic Interference: A Device for Probing Virtual Objects", DSC, vol. 55-1, Dynamic Systems and Control, ASME 1994, pp. 1-7.
Minamizawa, et al., "A Wearable Haptic Display to Present the Gravity Sensation", Second Joint EuroHaptics Conf and Symp. on Haptic Interfaces for Virtual Environments and Teleoperator Systems, 2007, pp. 1-6.
Ryu, et al., "Micro Hydraulic System Using Slim Artificial Muscles for a Wearable Haptic Glove", IEEE, 2008, pp. 3028-3033.
Shrewsberry, "Providing Haptic Feedback Using the Kinect", ASSETS 2011, Oct. 24-26, 2011, pp. 321-322.

* cited by examiner

*Primary Examiner* — David D Davis
(74) *Attorney, Agent, or Firm* — Pillsbury Winthrop Shaw Pittman LLP

(57) ABSTRACT

A virtual interaction system includes a haptic feedback apparatus, a depth camera and a processing circuit. The haptic feedback apparatus includes an solenoid mount supporting a plurality of solenoids, a plurality of hand mounts, and a controller. The solenoid mount is configured to be mounted onto a human arm. The plurality of hand mounts are configured to be mounted onto a plurality of positions on a human hand. Each of the plurality the hand mounts includes at least one contact element. Each contact element is controllably moveable by a corresponding solenoid. The controller is configured to receive an input signal, and generate, based on the input signal, a plurality of solenoid control signals.

21 Claims, 11 Drawing Sheets

WIRELESS HAPTIC FEEDBACK APPARATUS CONFIGURED TO BE MOUNTED ON A HUMAN ARM

REFERENCE TO RELATED APPLICATION AND PRIORITY CLAIM

This application is a utility filing from and claims priority to U.S. Patent Application Ser. No. 61/643,253, filed May 5, 2012, and U.S. Patent Application Ser. No. 61/671,777 filed Jul. 15, 2012, both of which are incorporated herein by reference.

FIELD

This application relates to the field of haptic feedback devices.

BACKGROUND

Haptic feedback devices are used as part of the human-machine interface. Haptic feedback is feedback or response information communicated by a computer or other machine to a human via touch. While electronic devices and equipment primarily provide visual and audible feedback, there has been increasing interest in providing tactile or haptic feedback. For example, it is known to provide haptic feedback in certain types of video games, such as by vibrating a handhold controller. Haptic feedback is also used for other purposes, such as to allow the user to experience feedback from a virtual object manipulated through motions of the hand. Examples of such devices are shown in U.S. Pat. No. 7,138,976 and U.S. Pat. No. 8,004,492.

Issues with prior devices are that such devices are often cumbersome, and provide only rudimentary feedback. For example, the haptic feedback device of U.S. Pat. No. 8,004,492 shows a feedback device that includes a force applying member coupled to the palm of the hand. As shown in FIGS. 2 and 3, the device requires multiple tethers to computing and solenoids, thereby reducing freedom of movement. Moreover, the types of forces provided to the user are rudimentary, often just limited to impulse and/or vibratory forces of different magnitudes. In addition, the position tracking of haptic devices has been a problem in the past because of drift of traditional sensors like accelerometers. Hence haptic sensory experiences such as gloves and body suits have not been used for spatial and full body interaction with virtual objects. The affordances created by depth sensing cameras have not been exploited to provide users new sensory experiences.

There is a need, therefore, for an improved haptic feedback device that exploit the position tracking of parts of the body, has reduced bulk, dynamic and meaningful feedback characteristics, to give users new kinds of experiences.

SUMMARY

At least some of the embodiments of the present invention address the above-described need by providing a wireless haptic device that provides controllably variable pneumatics-driven pressure to multiple positions on the hand of a user.

One embodiment of the invention is a virtual interaction system that includes a haptic feedback apparatus, a depth camera and a processing circuit. The haptic feedback apparatus includes a solenoid manifold supporting a plurality of solenoids, a plurality of hand mounts, and a controller. The solenoid manifold is configured to be mounted onto a human arm. The plurality of hand mounts are configured to be mounted onto a plurality of positions on a human hand. Each of the plurality the hand mounts includes at least one contact element. Each contact element is controllably moveable by a corresponding one of the plurality of solenoids from a first position to a variable pressure position. The controller is configured to receive an input signal, and generate, based on the input signal, a plurality of solenoid control signals. The controller controls the operation of the plurality of solenoids using the plurality of solenoid control signals. The depth camera device is configured to detect movement of a human hand and generate corresponding image signals thereof. The processing circuit is operably coupled to receive images signals from the depth camera, the processing circuit configured to generate the input signal based in part on the generated image signals, and wherein the processing circuit is further configured to communicate the input signal to the controller.

The above described features and advantages, as well as others, will become more readily apparent to those of ordinary skill in the art by reference to the following detailed description and accompanying drawings.

DESCRIPTION

Figure 1:
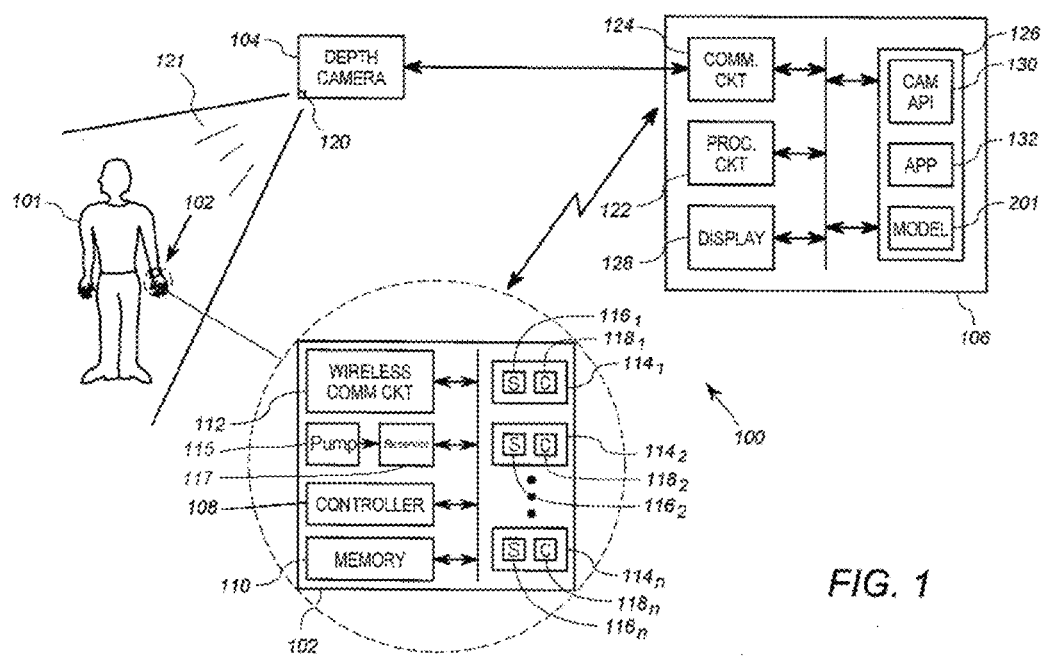
FIG. 1 shows a schematic block diagram of an exemplary virtual interaction system that incorporates embodiments of the invention.

FIG. 1 shows a schematic block diagram of an exemplary virtual interactive system 100 according to a first embodiment of the invention. The virtual interactive system 100 includes a haptic feedback device 102, a depth camera 104 and a computing system 106. The virtual interactive system 100 detects movements by a user 101 and provides haptic feedback to the user 101, wherein the haptic feedback corresponds to the detected position of the user 101 with respect to a virtual environment.

For example, the virtual interactive system 100 may suitably detect movements of a user 101, and then model the movement of the user (or another object) in virtual space within the computing system 106. The virtual interactive system 100 in such an example would further detect whether such movements resulted in "virtual" contact by the user "object" with other virtual objects in virtual space. Such operations in a general sense are typical of many types of video games, wherein user movements are translated to motion of the user or an object in the virtual environment of the game play. However, our system is different in the sense that controllers often embed accelerometers or gyro to track position and orientation. Position tracking is a very difficult problem with accelerometers because they have a drift problem. By virtue of using a 3D camera for position sensing the hand, our system avoids the problem. In any event, if virtual contact is detected, then the virtual interactive system 100 would cause the haptic feedback device 102 to provide haptic or tactile information (in the form of pressure or the like) to the user 101 corresponding to such virtual contact.

The haptic feedback device 102 is configured to be mounted on the user 101, for example, at least partially on the arm and/or hand. The haptic feedback device 102 includes a controller 108, a memory 110, a wireless communication circuit 112, and a plurality of solenoid modules $114_1$, $114_2 \ldots 114_8$. In this embodiment, each solenoid module $114_n$ includes a solenoid $116_n$ operably coupled to a contact element $118_n$. Each solenoid $116_n$ is operably connected to selectively cause a corresponding contact element $118_n$ to provide the controllable amount of pressure.

Each contact element $118_n$ is a device configured to provide a controllable amount of contact pressure to adjacent human flesh. In this embodiment, each contact element $118_n$ is mounted on different areas of the human hand, for example, on different fingers of the hand. In this embodiment, the each contact element $118_n$ is mounted to a different part of the hand of the user 101 by suitable means. In any event, further detail regarding a suitable finger mount or finger attachment is provided below in connection with FIGS. 5 and 6. The controller 108 is configured to receive an input signal, for example, via the wireless communication circuit 112, and generate, based on the input signal, a plurality of solenoid control signals, and control the operation of the plurality of solenoids $118_1 \ldots 118_n$ using the plurality of solenoid control signals. The wireless communication circuit 112 is any suitable wireless transceiver or receiver that can receive wireless data signals from the computing system 106. By way of example, the communication circuit 112 may suitably be a Bluetooth modem.

In this embodiment, the controller 108 is configured to control the operation of the plurality of solenoids $116_1 \ldots 116_n$ based on an input signal that is in the form of a contact signal received from, for example, the computing device 106. The contact signal includes parameters of a contact event to be communicated haptically to the user 101. As will be discussed below, the contact event may be related to a virtual contact between a virtual representation of the user 101 within a virtual environment, such as a video game, robotic, or virtual design environment.

The depth camera 104 is a camera that generates data corresponding to a visual depiction of a scene including both a two dimensional photograph of the scene and a corresponding depth map of 3D scene. The scene includes anything within the field of view 121 of the depth camera 104, including objects and subjects that are located at varying distances from the camera. The two dimensional photograph is typically generated with a digital camera and includes a two-dimensional array of pixels that form a photographic image of the scene. The depth map includes a plurality of data elements that correspond to a distance between the camera and different objects in the scene. In one embodiment, the depth map includes a distance value corresponding to each pixel and is called a depth image.

Depth cameras may take different forms, all of which generate the depth map corresponding to the photograph of the scene using one or more techniques that are known in the art. One commercially available embodiment of a depth camera that includes an active emitter and backscatter detector is the Microsoft Kinect®, which is sold by the Microsoft Corporation of Redmond, Wash. In other embodiments, the depth camera can be a stereoscopic device including two or more cameras that produce multiple photographs of a scene taken from different locations and generate a depth map with reference to the multiple photographs. Still other embodiments generate a depth map using one or more photographs from a single camera. For example, one embodiment identifies shadows in a photograph and identifies the distance from one or more objects in the scene to the camera with reference to the shadows.

The depth camera 104 in this embodiment includes a lens 120 positioned to obtain image information within a range of vision zone 121 in which the user 101 is positioned. The depth camera 104 uses the image information based on Primesense like hardware, described in Freedman et al, PrimeSense patent application US 2010/0290698, built into the Kinect The depth camera 104 is configured to communicate image signals to the computing system 106, as will be discussed further below.

The computing system 106 in this embodiment includes a processing circuit 122, a communication circuit 124, a memory 126 and a display 128. The processing circuit 122 may suitably be the processing device of any commercially available general purpose computer, or of any commercially available video gaming system. The communication circuit 124 is a circuit that provides a communication connection that is wireless, wired, or both, between external devices and the processing circuit 122. Thus, for example, the communication circuit 124 may include any suitable network interface card and a wireless LAN interface. The memory 126 includes volatile and non-volatile memory configured to store programming instructions and data employed and generated by the processing circuit 122. In this embodiment, the memory 126 includes, among other things, a camera API 130 and a virtual interaction application 132 that are executed by the processing circuit 122, along with other standard tools to carry out the operations of the processing circuit 122 as described herein.

In particular, the camera API 130 is a software module or tool that, when executed by the processing circuit 122, interprets image signals received by the depth camera 104 to generate skeleton representation and are commercially available. The skeleton representation identifies key points of the users body together forming the framework of the body, using well known algorithms that use the depth image to obtain the skeleton representation.

The virtual interactive application 132 is a software module or tool that, when executed by the processing circuit 122, generates a virtual three dimensional environment and inserts within that environment a virtual three dimensional model or avatar of the appendage of the user 101 based on the image data received from the camera API 130. The virtual interactive application 132 also, when executed by the processing circuit 122, generates contact signals indicating when and how the avatar (model of the appendage of the user 101) contacts virtual objects within the generated virtual environment. Such contact signals can include signals indicating the overall force of the contact (based on speed of contact and firmness of object contacted), the location of the contact on the avatar (i.e. which finger or fingers), and sharpness of contact (e.g. sharp edge vs. rounded edge vs. flat surface). Other variables such as movement over the avatar (i.e. from finger to finger) may also be part of the parameters provided in the contact signal. The glove has sensors such as strain gauge strip, which are mounted to of the knuckle areas of the user to get the elongation and correlated directly to angular position of the knuckle using standard known methods. This in turn gets the complete model of the hand. Knowing the position of the hand with respect to the camera, we can then calculate the position of the fingers and therefore the hand model with respect to the virtual object. By comparing the hand model including the fingers with the shape of the virtual object, one can detect using standard computational geometry algorithms, points of contact between the hand and the virtual object in the form of (X, Y, Z) coordinates on the shape as well as corresponding points on the hand surface model.

Figure 2:
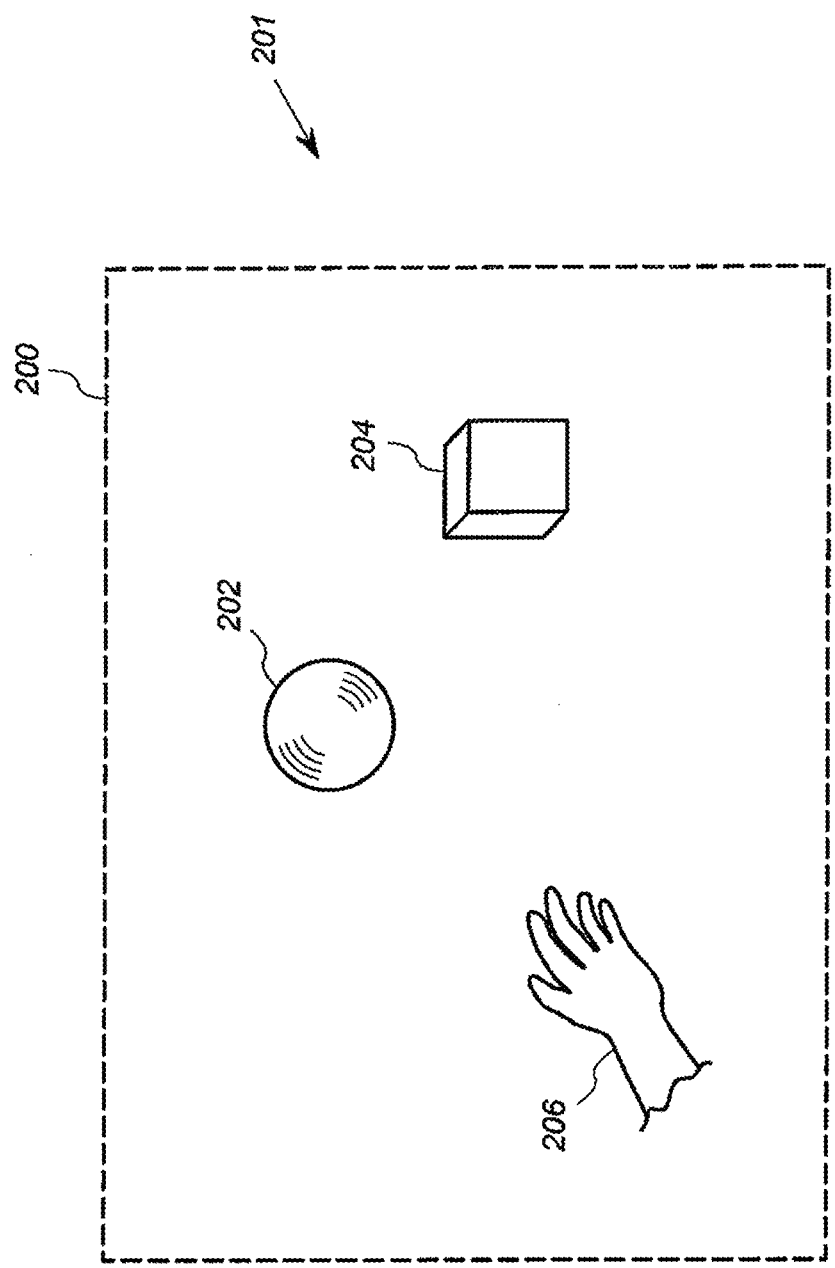
FIG. 2 shows a graphical representation of an exemplary virtual model that may be used in the virtual interactive system of FIG. 1

For example, FIG. 2a shows a representation of a virtual environment 200 that includes a first virtual object 202 in the form of a ball and a second virtual object 204 in the form of cube. Also shown in FIG. 2a is the user appendage avatar 206. The models 202, 204 and the avatar 206 can be represented in the application 132 in any suitable three dimensional object model format known in the art. The object models can be in the format of triangulated surface models which is commonly used in graphics or other solid model representations. The environment 200 is a predefined three dimensional virtual space in which the virtual objects are located. The environmental 200, the models 202, 204 and the avatar 206 are defined collectively herein as the model 201. The model 201 is stored in the memory 126 of FIG. 1.

In the example of FIG. 2a, the user appendage avatar 206 is not in contact with either virtual object 202, 204. Accordingly, in such a case, the virtual interactive application 132, as executed by the processing circuit 122, would not generate any contact signal. However, if further updating of model 201 results in a collision or contact of the avatar 206 with one of the virtual objects 202, 204, then the virtual interactive application 132 generates a contact signal having the parameters described above—overall force, location on the avatar, and bluntness or sharpness.

It will be appreciated that the contact signal may be as complex or as simple as desired. In some cases, it is enough to merely indicate contact location on the user object 206, and the depth and intensity of the contact. However, in this embodiment, it is contemplated that the contact signal will include the contact location (i.e. the fingers or other locations contacted) on the user object 206, the overall force, which can be a function of contact velocity and stiffness of the object contacted by the avatar 206, and the hardness at the location of contact on the object contacted. Based on the availability of information of the fingers the overall force, which may be rendered by a commercially available physics engines, will be subdivided into forces rendered to each portion of the hand Referring again to FIG. 1, the virtual interaction application 130, when executed by the processing circuit 122, generates a contact signal that includes multiple parameters of the detected contact. As discussed above, these parameters can include relative speed of contact, identification of portion of virtual user object contacted, the stiffness of the object contacted, and the hardness of the point of contact. Software capable of generating such signals is known, and is implemented in many known active participant video games as rendered by specialized physics engines used in games.

In operation, the processing circuit 122 first generates a virtual environment such as the virtual environment 200 of FIG. 2a. The generated virtual environment may or may not include virtual objects, for example, the objects 202 and 204 of FIG. 2a. Such virtual objects need not correspond to a real object. However, in some embodiments involving a virtual robotics environment, the virtual objects could correspond to real objects located in another location.

In any event, the processing circuit 122 then receives image signals from the depth camera 104. To this end, the depth camera 104 generates three dimensional depth images in a known manner, and the camera API 130 processes the information to identify the user 101 within the image.

Thereafter, the processing circuit 122 generates a user avatar and places the avatar within the virtual environment. To this end, the processing circuit 122 sizes and scales relevant portions of the user's body to fit in the virtual environment. The processing circuit 122 further places the sized and scaled avatar in a suitable starting location. With reference to the example of FIG. 2a, the processing circuit 122 would generate the avatar 206, and then scale and place the avatar 206 within the environment 200 as illustrated.

The processing circuit 122 then preferably causes the virtual environment to be displayed on the display 128. The display 128 thus provides a visual representation of the virtual environment (e.g. virtual environment 200) and the existing objects (e.g. virtual objects 202, 204) and the generated user avatar (e.g. user avatar 206). The user 101 thereby receives visual feedback of her avatar's position within the virtual environment.

The processing circuit 122 then, in an ongoing manner, processes movement of the virtual objects, and any movement of the user avatar. Movement of the user avatar is derived from signals received from the depth camera 104. For example, if signals from the depth camera 104 indicate a new position or movement of the user 101, then the processing circuit 122 translates the movement or position changed to the user avatar in the virtual environment. Contemporaneously, the processing circuit 122 updates the position information of any virtual objects if such objects move within execution of the application 132. With reference to the example of FIG. 2a, the processing circuit 122 may (in accordance with the application 132) change the location of (i.e. move) the location of the ball object 202 within the environment 200. The processing circuit 122 also updates the location of the avatar 206 within the environment if the image signals from the depth camera 104 indicate a new position.

Once the new positions within the virtual environment are determined, the processing circuit 122 causes the display 128 of the updated position information, providing feedback of to the user 101 of the detected movement of the user 101 and any change in position of virtual objects in the virtual environment.

The processing circuit 122 further determines whether a virtual contact event has occurred between the user avatar (e.g. virtual user avatar 206 of FIG. 2a) and another object in the virtual environment (e.g. the virtual ball object 202 of FIG. 2a). If not, then the processing circuit 122 continues to update new position information as described above. If, however, a virtual contact event is detected, then the processing circuit 122 generates a contact signal and transmits the contact signal wirelessly, via the communication circuit 124, to the haptic feedback device 102.

As discussed above, the contact signal includes multiple parameters of the detected contact. These parameters can include overall force of the contact, identification of portion of virtual avatar, the geometric shape information that will include local sharpness or bluntness or local curvatures of surfaces around the point(s) of contact.

The wireless communication circuit 112 of the haptic feedback device 102 receives the contact signal, and provides the contact signal to the controller 108. The controller 108 then generates a set of solenoid control signals based on the parameters within the contact signal. In particular, the controller 108 determines an appropriate solenoid signal sequence for each solenoid $114_1 \ldots 114_n$ based on, for example, the identification of the locations (e.g. fingers) that experienced the virtual contact, the overall force of the contact, and force distribution to each sector of the solenoid controlling the force in the corresponding portion of the hand, based on the speed of the contact and the stiffness of the object contacted, and the hardness of the point of contact. As discussed above, other parameters providing similar types of information in other formats or variants (total force, impact speed, etc.) may be employed.

As will be discussed below, in the embodiment described herein, the controller 108 develops solenoid signals that define, for each solenoid $116_n$, 1) the peak pressure to be applied by the corresponding contact element $118_n$, the 2) time (or slope) to peak pressure applied by the corresponding contact element $118_n$, and 3) the duration of the peak pressure for the corresponding contact element $118_n$. Since each solenoid $116_n$ may have different values of these parameters, the haptic feedback device 102 can provide different sensations to any or all of the contact elements $118_1 \ldots 118_n$. Such different sensations from the different contact elements $118_1 \ldots 118_n$ can be used to impart feedback communicating movement, object shape, and the like.

FIG. 3, for example, shows a force profile 300 of the expansion and retraction of a contact element such as any of the contact elements $118_1 \ldots 118_n$ of FIG. 1. The force N is the expansion force of the contact element 118, and corresponds directly to the sensation received on the opposing body part (e.g. finger tip) of the user 101. The force profile 300 represents the timeline of a single contact event on a single contact point of the user 101. The force profile 300 has three basic parts—a rise portion 302, a peak portion 304, and fall portion 306. Essentially, the impact on the user 101 can be varied by changing any of a plurality of parameters such as the peak value $F_{max}$ of the peak portion 304, the time duration $\Delta t$ of the peak portion 304, the slope kr of the rise portion 302, and the slope kd of all or part of the fall portion 306. The time T indicates the overall duration of all parts of the force impulse.

In general, the force profile 300 determines how the force on each feedback point (e.g. points adjacent to contact elements $118_1 \ldots 118_n$) varies over a period of time relating to a single contact event. The force profile 300 simulates the temporal force variation that occurs when a human hand contacts objects. The different parameters on the force profile 300 are utilized to provide different haptic feedback based on the nature of the contact event.

The rate at which the force N rises, kr, is proportional or at least correlated to the hardness of the surface of the virtual object and the relative velocity of the contact. The maximum level of force, $F_{max}$, and the total duration of the impulse, T, correlates to the strength of the impact. As the defined mass of the virtual object and the velocity of the impact increases, then the value of $F_{max}$ increases and the value of T decreases. It will further be understood that because the maximum value of $F_{max}$ is limited by the physical limitations of the solenoid module 114, the value of kr can be increased to indicate a stronger impact. Thus, within the physical confines of the solenoid module 114, many strengths and types of contact can be modeled by manipulation of the parameters.

Figure 3A:
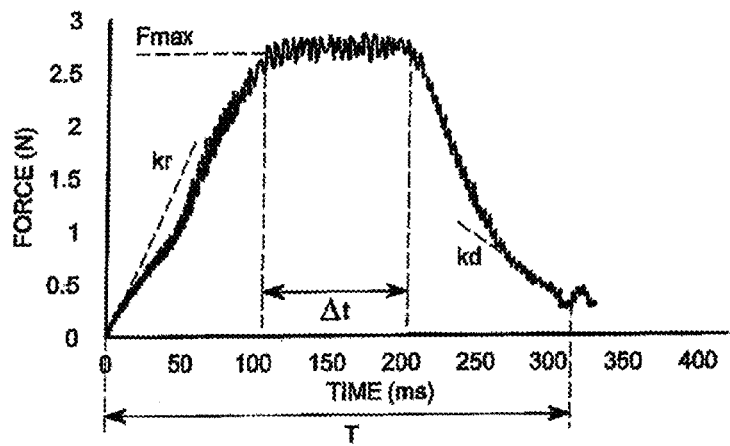
FIG. 3 shows a timing diagram of an exemplary force profile of force generated by haptic feedback contact element of the virtual interactive system of claim 1.
Figure 3B:
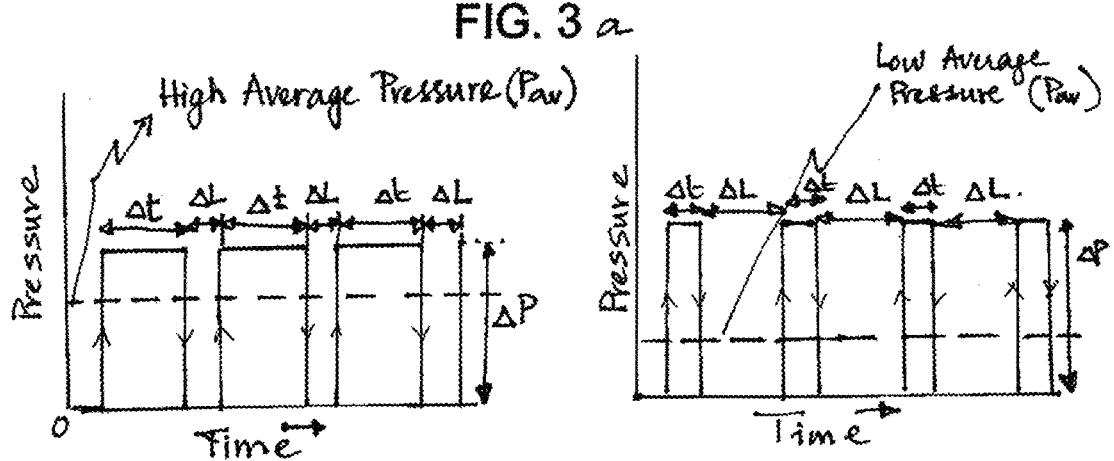

As shown in FIG. 3a, in addition, the value of $\Delta t$ can be increased to simulate the long lasting feeling of a strong impact. The rate at which the force diminishes, kd, can be correlated to the velocity at which the virtual object leaves the contact. As shown in FIG. 3b, using varying time ratios of solenoid-on $\Delta t$ and solenoid-off $\Delta L$, varying in fast succession below user threshold of feeling the pressure, the solenoid can render an average pressure $P_{av}$. The average pressure $P_{av}$ is the time weighted average of the on and off pressures.

In addition, modulation of the rise slope kr and fall slope kd can provide the impression of how sharp or acute the impact is. A higher slope value (faster rise time) increases the impression of sharpness or acuity of the contact while a lower slope value (slower rise time) increases the impression of the softness of a contact. For example, lightly contacting the point of a virtual "needle" object may have a very fast rise time (i.e. high kr), but only a moderately high $F_{max}$ on a single finger, while lifting a virtual bag of sand may have a slower rise time (i.e. lower kr), but a higher $F_{max}$ and greater $\Delta t$ on all fingers. The ability to adjust these parameters allows for many discernible, distinctive contact events for each contact point of the user.

Referring again to FIG. 1, after the controller 108 develops the solenoid control signals for each solenoid module $114_1 \ldots 114_n$, the controller 108 provides the solenoid control signals to the corresponding solenoids $116_1 \ldots 116_n$. To this end, the controller 108 provides the solenoid control signals to the solenoids $116_1 \ldots 116_n$ in a time synchronized fashion. Each solenoid 116, responsive to the received solenoid control signal, causes the contact element 118 to apply the contact pressure with a force profile (see, e.g. FIG. 3) that corresponds to the solenoid control signal. Using time synchronization, pressure may be applied to the user's contact points via the contact element 118 simultaneously, or in a predefined sequence if desired. Further detail regarding sequencing of contact elements $118_1 \ldots 118_n$ to create still further distinctive haptic effects is provided below in connection with FIG. 8.

The user 101 thus receives haptic feedback on a plurality of contact points (e.g. multiple fingertips) which can vary in overall pressure, sharpness and duration. The user 101 may then adjust her movements responsive to the haptic feedback. In any event, the adjustable and controllable haptic feedback to multiple contact points on the user 101, all provided on a wireless device, can enhance almost any virtual reality experience.

FIGS. 4-7 show in further detail an exemplary embodiment of the haptic feedback device 102. As will be discussed below, in the embodiment of FIGS. 4-7, each contact element 118 comprises an air bladder that is disposed in contact with a finger tip of the user 101. The air bladder can be controllably inflated and deflated in accordance with a desired force profile, such as that shown in FIG. 3.

Referring now to the embodiment of FIGS. 4-7, FIG. 4 shows an electrical and mechanical schematic functional diagram of the haptic feedback device 102. The exemplary haptic feedback device 102 of FIG. 4 includes four solenoids $116_1 \ldots 116_4$ and four contact elements in the form of bladders $118_1 \ldots 118_4$. The controller 108, which may suitably be a microcontroller, is operably coupled to provide solenoid control signals to each solenoid $116_x$.

Each of the solenoids $116_1 \ldots 116_n$ is a commercially available solenoids. These solenoids $116_1 \ldots 116_n$ are all mounted in the solenoid manifold 406. This manifold provides connections from the solenoids $116_1 \ldots 116_n$ to high and low pressure air sources. The high pressure air comes from a connection with reservoir 117 which is pressurized by pump 115. The low pressure air comes from a port to atmospheric pressure. Each solenoid 116 has a controllable output by the ratio of high pressure time to low pressure time. The control signal oscillates between high and low faster than a human can perceive. This allows the pressure in the pad to reach what feels like a value between the high and low values. This high to low ratio is controlled by signals, such as the solenoid control signals from the controller 108.

Figure 7:
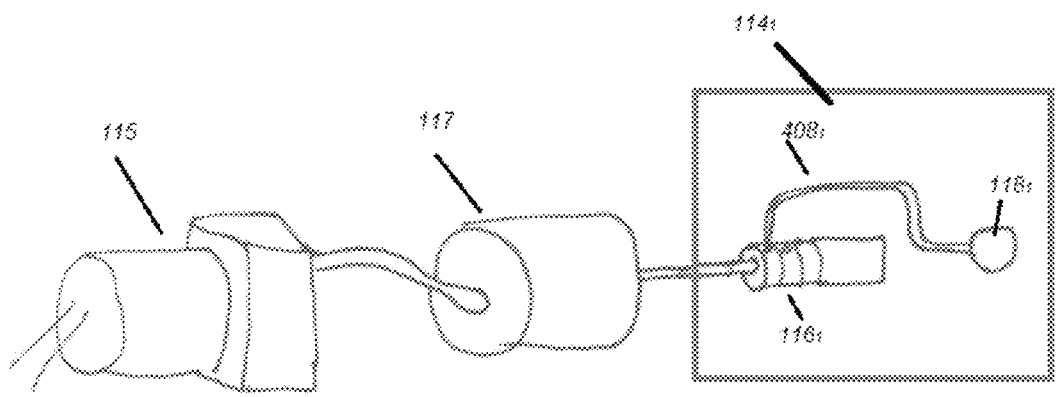
FIG. 7 shows a schematic block diagram of an exemplary solenoid module that may be employed in the virtual interactive system of FIG. 1.

Further detail regarding the operation of the solenoids $116_1 \ldots 116_n$ is provided below in connection with FIG. 7. In particular, FIG. 7 shows a functional block diagram of an exemplary solenoid module $114_1$, including further mechanical detail of the solenoid $116_1$. As shown in FIG. 7, the solenoid $116_1$ further includes a linkage to the reservoir 117. Reservoir 117 is then connected to pump 115 which serves as the high pressure air source for the system.

As shown in FIG. 7, the solenoid $116_1$ has 3 ports. When the solenoid is inactive the common air line $408_1$ is connected directly to atmospheric pressure, which serves as the low pressure source for this system. As pressure pad $118_1$ is elastic this causes pressure pad $118_1$ to deflate. If the solenoid $116_1$ is powered the common air line $408_1$ is connected to the reservoir 117. This connection to the high pressure source causes the air bladder to inflate. The air conduit $408_1$ may suitably be an elastomeric tube or hose. The solenoid $116_1$, the air conduit $408_1$, and the bladder $118_1$ preferably form a substantially air-tight system.

Referring again to FIG. 4, the haptic feedback device 102 further includes an energy source 402 in the form of one or more high efficiency lithium ion batteries. The energy source 402 is operably connected to provide operating power to the wireless communication circuit 112, the controller 108, the memory 110, and the servo devices $404_1 \ldots 404_n$.

Figure 4:
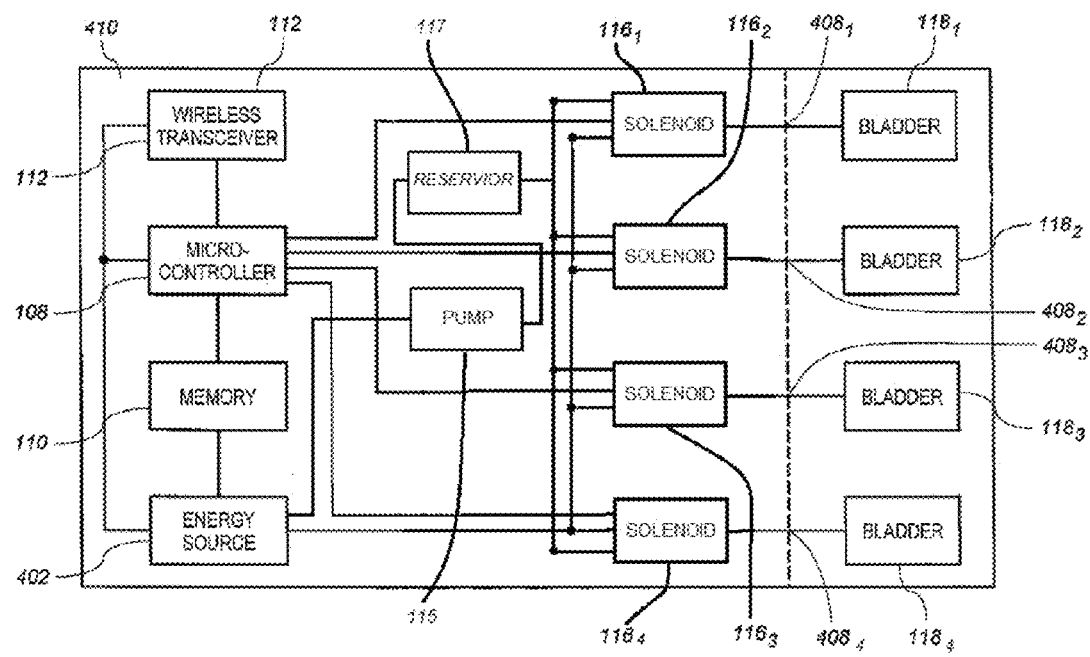
FIG. 4 shows in further detail a schematic block diagram of an exemplary embodiment of a haptic feedback device that may be used in the system of FIG. 1.

The energy source 402, the wireless communication circuit 112, the controller 108, the memory 110, and the solenoids $116_1 \ldots 116_n$ are all supported on a wrist or forearm-mounted base, such as a sleeve or the like, with a housing or other rigid base affixed to the sleeve, not shown in FIG. 4. Accordingly, the weight of those devices is borne by portions of the user 101 (the forearm and wrist) that are less sensitive to touch. The contact elements $118_1 \ldots 118_4$, by contrast, are disposed at an operative location on the user, such as the fingertips, as will be discussed below in connection with FIGS. 5 and 6. The entire haptic feedback device 102 in this embodiment is completely portable, wireless, and lightweight.

Figure 5:
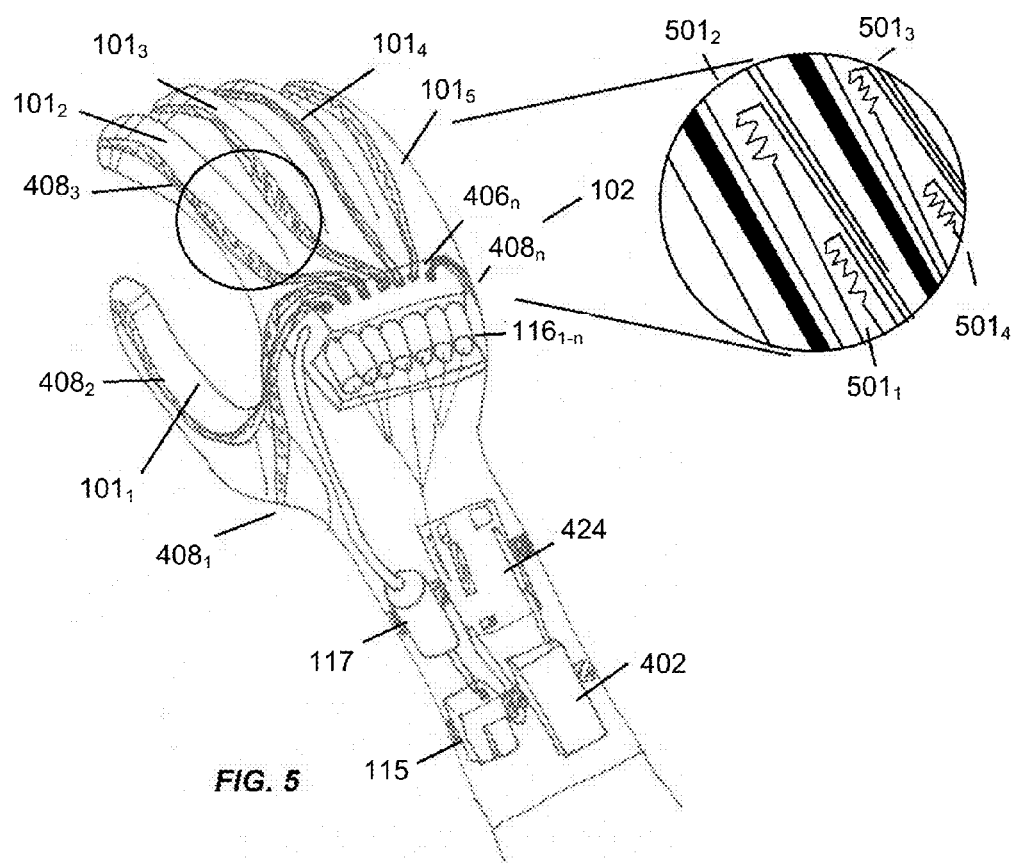
FIG. 5 shows a perspective view of the haptic feedback device of FIG. 4 mounted on a user.

FIG. 5 shows a plan view of the haptic feedback device of FIG. 4. As can be seen, the haptic device 102 includes a wrist mounted base 410 in the form of an expandable sleeve constructed of strong fabric. The wrist-mounted base 410 supports a circuit board 424 and the solenoids $116_1 \ldots 116_4$. The circuit board 424 that supports the wireless communication circuit 112, the controller 108, the memory 110, and the energy source 402. As shown in FIG. 5, the haptic feedback device 102 of FIG. 4 further includes four finger attachments $412_1 \ldots 412_4$ configured to be secured to respective fingers $101_1 \ldots 101_4$ of the user 101.

Figure 6:
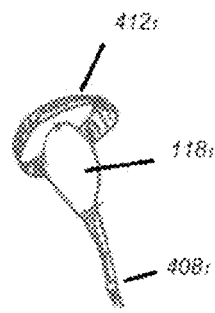
FIG. 6 shows a perspective view of a finger attachment of the haptic feedback device of FIGS. 4 and 5.

With reference to FIG. 6, the finger attachment $412_1$ is a small fabric wrap which stays in place due to elastic tension, which is well-known in the art. The small fabric wrap is configured to wrap around the finger. The contact element $118_1$ is secured to an interior surface of the finger attachment $412_1$, and the air conduit $408_1$ extends up to (and is fluid communication with) the contact element $118_1$.

Accordingly, with simultaneous reference to FIGS. 5 and 6, the finger attachment $412_1$ is secured to the finger $101_1$ of the user 101 by wrapping the finger attachment $412_1$ around the fingertip such that the contact element $118_1$ is directly in contact (or indirectly through a thin sheet of fabric or plastic) with the fingertip of the finger $101_1$.

Each of the other finger attachments $412_2 \ldots 412_4$ is constructed in a manner analogous as the finger attachment $412_1$. As a consequence, when the finger attachments $412_2 \ldots 412_4$ are secured to corresponding fingers as shown in FIG. 5, the contact element $118_2$ is disposed to make contact with the fingertip on the first finger $101_2$ of the user 101, the contact element $118_3$ is disposed to make contact with the fingertip on the first finger $101_3$ of the user 101, and so forth.

In operation, the user 101 first dons the haptic feedback device 102 by placing the wrist-mounted base 410 around the wrist of the user 101, as shown in FIG. 5. The finger attachments $412_1 \ldots 412_4$ are then placed on four respective fingers $101_1 \ldots 101_4$ of the user 101 in the manner described above by putting on the glove. As a result, the corresponding contact elements $118_1 \ldots 118_4$ are disposed adjacent to the user's fingertips.

After placement of the finger attachments $412_1 \ldots 412_4$ on the finger $101_1 \ldots 101_4$ and the wrist-mounted base 410 on the wrist and/or forearm, the haptic feedback device 102 appears as shown in FIG. 5. The user 101 may then power up the haptic feedback device 102, by connecting the energy source 402 to the power using elements. To this end, any suitable power switch or coupling, not shown, may be employed.

In use, the wireless communication circuit 112 from time to time receives an input signal, for example, from a game console, or from the computing device 106 of FIG. 1, that contains a contact signal including contact parameters. As discussed above in connection with FIG. 1, the contact signal may include parameters defining a contact event. A contact event may correspond to a virtual contact in a virtual environment, such as a virtual contact corresponding to the user 101 contacting a ball object (e.g. ball object 202 of FIG. 2A), or picking up a cube object (e.g. cube object 204 of FIG. 2A).

The contact signal for the contact event includes information regarding the nature of the contact, including firmness of the contact, sharpness of the contact, area of contact on the user, and even whether the contact moved across multiple areas of the user. The controller 108 receives the contact signal from the wireless communication circuit 112 and parses the contact event information therefrom.

Thereafter, the controller 108 determines for each solenoid module $114_n$, a force profile $FP_n$, based on the parameters in the contact signal. Each force profile $FP_n$ may suitably include values representative of the peak value $F_{max}$ of the pressure to be applied, the time duration $\Delta t$ at the peak value $F_{max}$, the slope kr rising to the peak value $F_{max}$, and the slope kd falling from peak value $F_{max}$.

Figure 9:
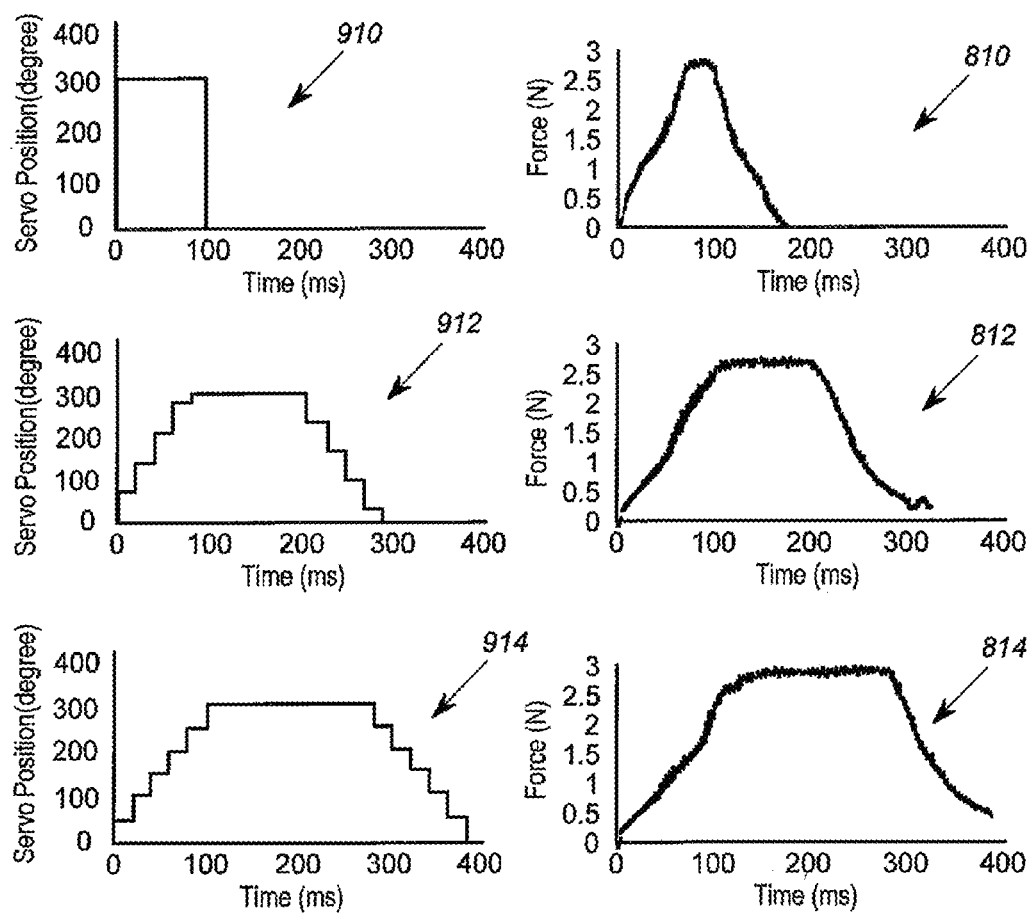
FIG. 9 shows exemplary timing diagrams of the solenoid control signals generated by the controller of the haptic feedback system of FIG. 4 carrying out the contact event of FIG. 8.

FIG. 3, discussed further above, shows an exemplary force profile 300 having these characteristics. It will be appreciated, however, that the values determined by the controller 108 that correspond to $F_{max}$, $\Delta t$, kd, kr, and T may not be values that are literally equal to the values of the force profile 300 of the corresponding contact element $118_n$. In particular, the controller 108 instead calculates values that for the solenoid $116_n$ that cause the solenoid $116_n$ to generate forces approximating the force profile as defined by $F_{max}$, $\Delta t$, kd, kr, and T. For example, as shown in FIG. 9, discussed further below, the each force profile 810, 812, and 814 corresponds to a set of servo position signal diagrams 910, 912 and 914. The controller 108 generates the patterns shown in the signal diagrams 910, 912 and 914 to cause the corresponding solenoid $116_n$ to actuate the respective contact element $118_n$ in a manner that corresponds to the force profiles 810, 812 and 814.

In any event, the controller 108 determines the values corresponding to $F_{max}$, $\Delta t$, kd, kr, and T (and hence solenoid control signal sequence) based on the parameters in the received contact signal. Based on the stiffness and impact velocity between the hand and virtual object, the pressure rendered gives a relative feeling of the stiffness of the virtual object.

The controller 108 then provides suitable corresponding signals to the servo devices $404_1 \ldots 404_4$. In general, the controller 108 provides information identifying a sequence of high to low pressure ratios for solenoid $116_n$. In this embodiment, the peak value $F_{max}$ corresponds to constant activation of solenoid $116_n$ for the finger $101_n$ for the current contact event. The slope kr corresponds to the rate at which the high to low pressure ratio of solenoid $116_n$ changes. The time value $\Delta t$ corresponds to the time that the solenoid $116_n$ is held at its maximum pressure ratio, and the slope kd corresponds to the rate at which the high to low pressure ratio of solenoid $116_n$ changes back to its start position from the maximum pressure.

Each solenoid $116_n$ receives the solenoid control signal sequence. In response, each solenoid $116_n$ generates an elevated pressure at its output $414_n$ in a pattern corresponding to the received solenoid control signal sequence. As a result, it will be appreciated that the solenoid $116_n$ moves in either a pressure increasing or pressure decreasing direction. For example, referring briefly to the signal pattern 912 of FIG. 9, it can be seen that in the initial parts of the pattern 912, the pressure ratio of the solenoid $116_n$ increases in steps, thereby moving in a pressure increasing direction, until a maximum (corresponding to $F_{max}$) is reached. After a time at the maximum pressure ratio, corresponding to $\Delta t$, the pressure ratio of the solenoid $116_x$ decreases, thereby moving in a pressure decreasing direction.

When the solenoid $116_n$ moves in the pressure decreasing direction, the conduit $408_n$ is connected to the high pressure reservoir 117 for an increasing amount of time. A net flow of air/fluid passes through the conduit $408_n$ and into the corresponding air bladder $118_n$. The displaced air/fluid causes the air bladder $118_n$ to expand. The rate and extent of expansion correlate approximately to kr and $F_{max}$, respectively. The expansion of the air bladder $118_n$ creates a force against the fingertip of the finger $101_n$ of the user 101.

When the solenoid $116_n$ moves in the pressure decreasing direction, the solenoid $116_n$ moves back to lower pressure ratios toward the originating position (or rest position). Ideally, the solenoid $116_n$ moves back from the maximum pressure ratio (corresponding to $F_{max}$) at a rate corresponding to kd. As a result, the solenoid $116_n$ moves in a pressure decreasing direction. This causes a net flow of air/fluid to return through the conduit $408_n$ from the corresponding air bladder $118_n$ because the conduit $408_n$ is connected more to the low pressure source. The returned air/fluid causes the air bladder $118_n$ to retract or deflate. As discussed above, the rate of deflation correlates approximately to kd. The retraction of the air bladder $118_n$ removes the force from the fingertip of the finger $101_n$ of the user 101.

Thus, based on parameters of a received input signal, the embodiment of the haptic feedback device 102 of FIGS. 4-7 can be used to provide varying types of pressure to different contact points on the user. It will readily be appreciated that the principles of the haptic feedback device 102 of FIGS. 4-7 may readily be expanded to additional contact points on the hand by adding new solenoids $116_5 \ldots 116_n$ and their corresponding contact elements $118_5 \ldots 118_n$.

Figure 8:
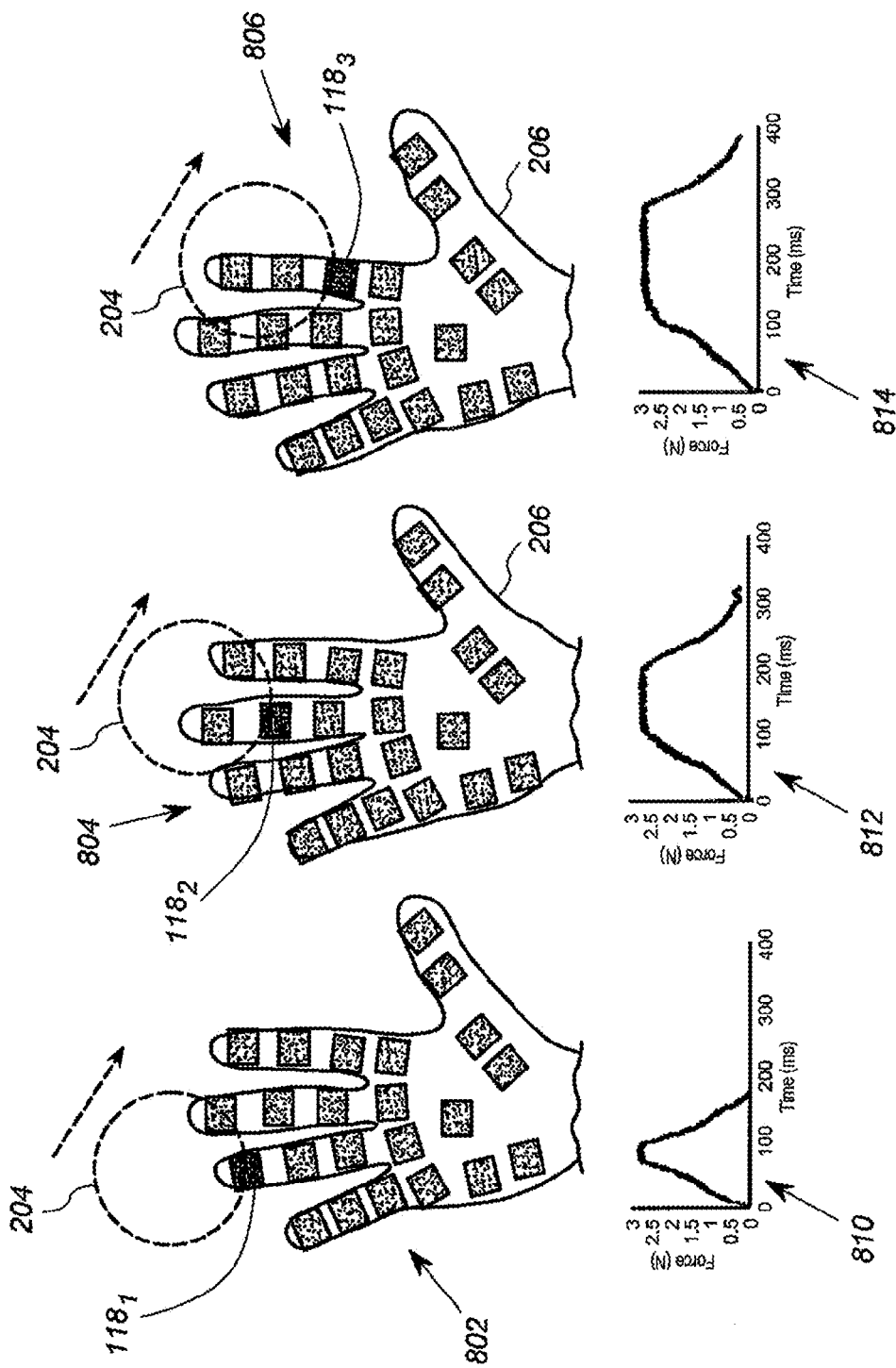
FIG. 8 shows a representative diagrams illustrating a sequence of an exemplary contact event of the virtual interact system of FIG. 1.

FIG. 8, for example, shows, among other things three representative diagrams 802, 804, 806 of a user's hand with several additional contact elements in addition to contact elements $118_1$, $118_2$ and $118_3$. It will be appreciated that any number of contact elements may be employed. In some cases, more than one contact element $118_n$, $118_{n+1}$, etc. may be connected to the same solenoid $116_n$ and thereby uniformly controlled.

Regardless of the number of contact points, FIG. 8 further shows representative diagrams 802, 804 and 806 of an exemplary contact event. The diagrams 802, 804, 806 show contact elements $118_1$, $118_2$, etc. of an alternative embodiment the feedback device 102 superimposed on virtual hand avatar 206 of FIG. 2. The diagrams 802, 804, 806 further show a sequence of a moving virtual object, such as the virtual ball 202, across the hand avatar 206. In this example, the virtual ball 202 moves across the hand avatar 206 in positions corresponding to contact elements $118_1$, $118_2$, and $118_3$. The diagrams 802, 804, 806 occur in sequence, illustrating the movement of virtual ball 202 with respect to the hand avatar 206. In this embodiment, the contact elements $118_1$, $118_2$ and $118_3$ are disposed on sequential fingers of the hand.

With reference to FIG. 8, in accordance with one embodiment of the invention, the controller 108 generates solenoid control signals for the contact elements $118_1$, $118_2$ and $118_3$ as a collective event, and coordinates the timing of the delivery of the solenoid control signals to convey the direction and depth of the moving contact. To this end, in a first embodiment, the controller 108 may simply provide the same solenoid control pattern sequence, such as the sequence 912 of FIG. 9, to each of the solenoids $116_1$, $116_2$ and $116_3$ (see FIG. 4) in a time-staggered fashion. In other words, the controller 108 would provide the sequence 912 to the solenoid $116_1$ at a time $t_1$, then provide the same sequence 912 to the solenoid $116_2$ at a time $t_1+\delta$, and then provide the same sequence 912 to the solenoid $116_3$ at a time $t_1+\delta+\sigma$. The values of $\delta$ and $\sigma$ may be more or less than T, depending on the speed of the velocity of the movement of the virtual ball 202 across the hand avatar 206. As a result, the contact elements $118_1$, $118_2$, and $118_3$ provide contact sensations to their respective fingers in a sequence approximating or mimicking that of the movement of the ball object 204.

In accordance with another embodiment, however, the sensation of the same moving contact is conveyed instead by varying the kd and kr. In particular, in such an embodiment, the controller 108 provides, responsive to contact signals indicative of the contact event illustrated in diagrams 802, 804, 806, a set of signal patterns 910, 912 and 914 shown in FIG. 9 to the respective solenoids $116_1$, $116_2$ and $116_3$. As a result, the contact elements $118_1$, $118_2$ and $118_3$ generate respective force profiles 810, 812 and 814 on the fingers. In this embodiment, the controller 108 in this case starts each pattern 910, 912 and 914 at about the same time.

However, as shown in FIGS. 8 and 9, the rise slope kr is steadily decreased for the contact elements $118_1$, $118_2$, and $118_3$ from the point of initial contact (contact element $118_1$) to the point of final contact (contact element $118_3$). Accordingly, each of the contact elements $118_1$, $118_2$ and $118_3$ reach their peak values at staggered times, even though the patterns 910, 912 and 914 start at the same time. This has been found to provide a sense of motion across the corresponding contact points reflective of the sequence of representations 802, 804 and 806 of FIG. 8.

The varying of kr and kd as discussed above provides a smoother motion feeling than that of simply sequentially delaying the onset time of the solenoid movement. In part, this smoother feeling can relate to the sensation of acceleration and deceleration as a result of the contact event and contact movement. Moreover, because human cannot perceives time differences that are lower than 200 ms, the varying force profiles similar to that shown in FIG. 8 may be used to indicate faster motions.

In addition to the foregoing, the embodiment of FIG. 4 allows for control to provide haptic feedback in the form of stimulus offset asynchrony (SOFA). In particular, it is possible to start all three signal patterns with the same kr at the same time, but vary Δt and/or kd to change force profiles to simulate non-uniform contact on the hand. The user 101 in such as case detects the sense of travel across the hand by the different durations of the force profile (due to varied Δt and/or kd).

Figure 10:
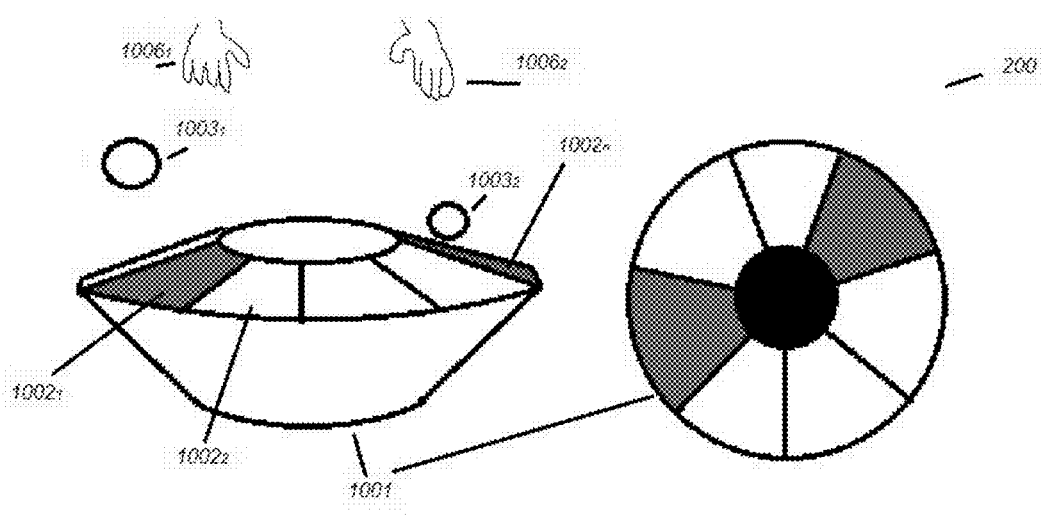
FIG. 10 shows a representation of a virtual environment that includes a first virtual object in the form of a musical drum.

In another embodiment, for example, FIG. 10 shows a representation of a virtual environment 200 that includes a first virtual object 1001 in the form of a musical drum. Also shown in FIG. 10 is the user appendage avatar $206_1$ controlling the virtual object $1003_1$ and second appendage avatar $206_2$ controlling the virtual object $1003_2$. The virtual objects and object models can be in the format of triangulated surface models, which are commonly used in computer graphics or other solid model representations. The environment 200 is a predefined three-dimensional virtual space in which the virtual objects are located. The environment 200, the models 1002, 1003 and the avatar 206 are defined collectively herein as the model 201. The model 201 is stored in the memory 126 of FIG. 1.

In the example of FIG. 10, the controlled object 1003 is initially not in contact with virtual object 1002. The virtual object in turn has regions $1002_1$, $1002_2$ . . . $1002_n$. Accordingly, in such a case, the virtual interactive application 132, as executed by the processing circuit 122, would not generate any contact signal. However, if further updating of model 201 results in a collision or contact of the controlled object 1003 with one of the virtual objects sectors $1002_n$ then the virtual interactive application 132 generates a contact signal having the parameters described above—overall force, location on the controlled object with respect to the regions of the virtual object, the angle the controlled object 1003 impacts the sector in 1002, and generates a sound corresponding to the impact force, angle of impact, shape of the virtual object and sector. The controlled object 1003 shape, controlled object 1003 velocity, impact force, angle of impact, shape of object and sector user is interacting with, are all collectively called user interaction parameters with the virtual object 1002.

As a result, the contact elements $118_1$, $118_2$, and $118_n$ provide contact sensations to their respective hand contact points $101_1$, $101_2$, and $101_n$ of the real hand skin in a sequence approximating or mimicking that of the hitting of the virtual object 1002 by that of the controlled object 1003. The coordination of this sensation with the hand movement towards the virtual object 1002 and sight of the controlled object 1003 hitting the drum especially as seen by augmented reality glasses that are commercially available, renders a whole experience that is highly realistic.

The avatar 206 may further modify the shape of the virtual object 1002 as a whole or the sectors $1002_n$. The sound on impact is modified according to a programmed drum model for creating new sounds based on the shape of the drum. These shape models to sound mapping can be preprogrammed and implemented in commercially available sound design software.

In a different embodiment, a plurality of bladders 118 are made into a vest 1102 and wrapped around the front part of the body $101_1$ forming for instance a body suit as shown in FIG. 11a. The energy source 402, controller 402, pump 115 and reservoir 117 are belted around the waist along with the solenoid manifold 406. Two users wearing standard commercially available augmented reality goggles 1104 see each other avatars $1106_1$ and $1106_2$ carrying devices such as virtual pistols $1107_1$ and $1107_2$ and virtual hats $1108_1$ and $1108_2$. These virtual objects appear to move with the hand and body as superimposed on the avatar models $1106_1$ and $1106_2$ within the computer.

On firing the pistol $1107_2$ a virtual object 202 representing a bullet moves towards the user while being controlled by a physics game engine on the computer 106. On colliding with the avatar of the body $1106_1$ represented within the computer 106, the appropriate solenoid $116_n$ opens and applies pressure to the user 101. In this embodiment, the depth camera 104 senses the user 101 position and posture, sends the body position to the computer 106, which determines the position on the user 101 that virtual object 202 collides with. The computer 106 sends the information of the position and solenoid to activate to then render pressure using the appropriate bladder $118_n$ at the appropriate location on the user 101.

Figure 11:
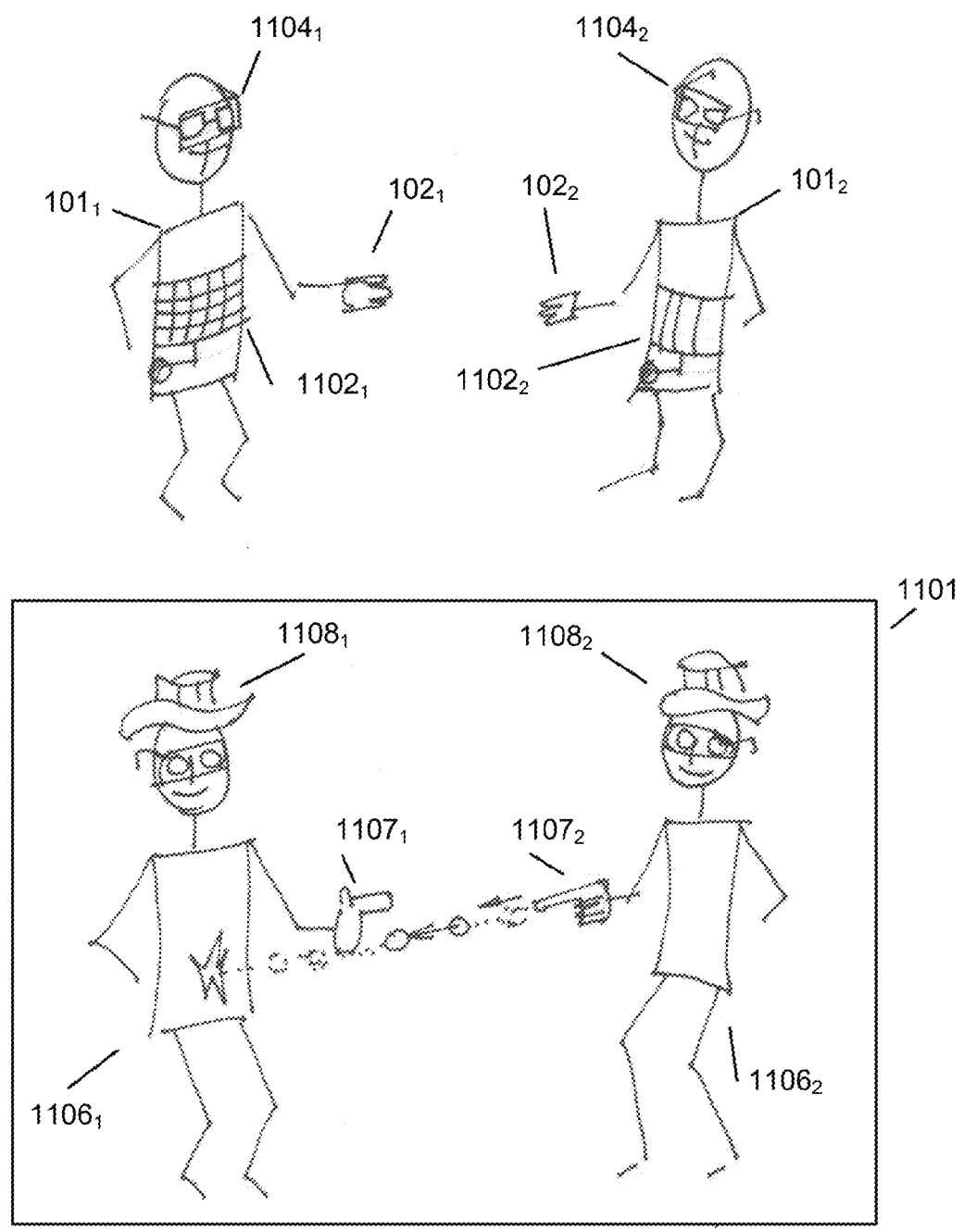
FIG. 11 shows an embodiment in which a plurality of bladders is wrapped around any part of the user.
Figure 12:
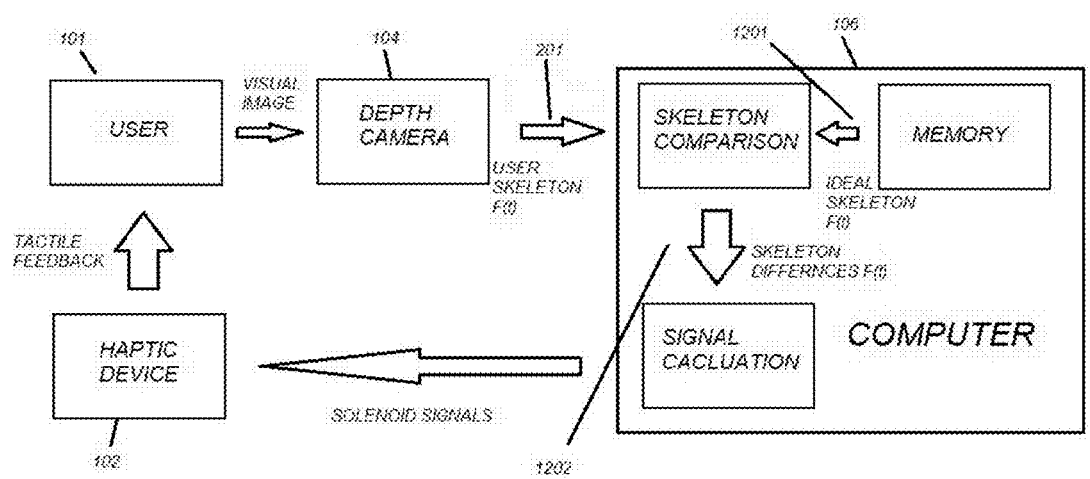
FIG. 12 shows an example of how a difference between an ideal position in a computer model where skeletal position is a function of time and the actual body skeleton is compared.

In a yet another embodiment, the plurality of bladders $118_n$ is wrapped around any part of the user 101 as shown in FIG. 11, especially sensitive parts for feeling pressure. The depth-sensing camera 104 acquires the user 101 skeletal posture and movement. As shown in FIG. 12, the computer compares user skeleton model 201 provided by the API 130 with the ideal skeleton model 1201 for good posture represented in the computer 106. This acquisition of the body posture and user skeleton model 201 and comparison with ideal posture and skeletal model 1201 of the body happens continuously as a function of time F(t), to create posture and skeletal differences 1202, and is only limited by the processing power of the computer 106. Such a dynamic comparison of user posture with time can be used for training or learning such as playing golf or doing yoga.

The difference in position between the ideal position in computer model 201 where skeletal position is a function of time and the actual body skeleton is compared as shown in FIG. 12. The difference is computed in the computer a signal to be generated is calculated. This signal is then rendered as a pressure on the haptic device at appropriate portion of the user 101 through pressure actuation of the bladders 118. This will allow the actual human to correct his posture towards the ideal posture. When the correction is made for instance with reduced skeletal and posture differences 1202, the new pressure magnitudes are reduced. When the error in positions between the actual skeleton and computer skeleton are within a threshold for that particular instance in time no pressure is rendered.

It will be appreciated that the above-describe embodiments are merely illustrative, and that those of ordinary skill in the art may readily devise their own implementations and modifications that incorporate the principles of the present invention and fall within the spirit and scope thereof.

What is claimed is:

1. A haptic feedback apparatus comprising:
   a solenoid manifold comprising at least a first solenoid and at least a portion of the manifold, the solenoid manifold configured to be mounted onto a human arm;
   at least a first finger mount configured to be mounted onto a human finger, the first finger mount including at least one bladder coupled to receive air from the solenoid manifold when said first solenoid is activated by a controller; and the controller, wherein the controller is configured to,
 receive an input signal;
 control the operation of the first solenoid responsive to the input signal.

2. The haptic feedback apparatus of claim 1, wherein the solenoid manifold includes a second solenoid, and further comprising:
 at least a second finger mount configured to be mounted onto a second human finger, the second finger mount including at least one bladder coupled to receive air from the solenoid when said second solenoid is actuated by the controller; and
 wherein the controller is further configured to control the operation of the second solenoid responsive to the input signal.

3. The haptic feedback apparatus of claim 2, wherein the controller is configured to, responsive to the input signal:
 generate a first solenoid control signal having at least a first characteristic based on the input signal;
 generate a second solenoid control signal having at least a second characteristic based on the input signal, the second characteristic differing at least in part from the first characteristic; and
 at least in part contemporaneously provide the first solenoid control signal to the first solenoid and provide the second solenoid control signal to the second solenoid.

4. The haptic feedback apparatus of claim 3, wherein the first characteristic defines a first average pressure of the at least one bladder of the first finger mount, and the second characteristic defines a second average pressure of the at least one bladder of the second finger mount, the first pressure differing from the second pressure.

5. The haptic feedback apparatus of claim 3, wherein the first characteristic defines a first time to a first average pressure of the at least one bladder of the first finger mount, and the second characteristic defines a second time to a second average pressure of the at least one bladder of the second finger mount, the first time differing from the second time.

6. The haptic feedback apparatus of claim 5, wherein the first average pressure is substantially equal to the second average pressure.

7. The haptic feedback apparatus of claim 1, wherein the controller is further configured to:
 generate a solenoid control signal having characteristics corresponding the input signal, the control signal having a first portion and a second portion, the second portion defining an average pressure of the at least one bladder of the first finger mount, and the first portion defining a rise time to the average pressure of the at least one bladder of the first finger mount;
 use the solenoid control signal to control the first solenoid.

8. The haptic feedback apparatus of claim 1, further comprising a wireless communication circuit configured to receive a message containing the input signal from an external device.

9. The haptic feedback apparatus of claim 8, further comprising an arm mount, wherein the solenoid manifold is supported by the arm mount.

10. The haptic feedback apparatus of claim 8, further comprising a self-contained power source supported by the arm mount.

11. The haptic feedback apparatus of claim 10, wherein the controller:
 at least in part contemporaneously provide the first solenoid control signal to the first solenoid and provide the second solenoid control signal to the second solenoid.

12. The haptic feedback apparatus of claim 11, wherein the peak average pressure defined in the first set of characteristics differs from the peak average pressure in the second set of characteristics.

13. The haptic feedback apparatus of claim 11, wherein the time to peak of the first set of characteristics differs from the time to peak of the second set of characteristics.

14. A haptic feedback apparatus comprising:
 an solenoid manifold a first solenoid, the solenoid manifold configured to be mounted onto a human arm;
 at least a first finger mount configured to be mounted onto a human finger, the first finger mount including at least contact element, the contact element controllably moveable by the first solenoid from a first average pressure to a variable pressure conditions;
 a controller configured to,
  receive an input signal;
  generate, based on the input signal, an solenoid control signal having a first set of characteristics defining an average pressure of the at least one contact element and defining a time to peak of the at least one contact element; and
  control the operation of the first solenoid using the solenoid control signal.

15. The haptic feedback apparatus of claim 14, wherein the solenoid manifold includes a second solenoid, and further comprising:
 at least a second finger mount configured to be mounted onto a second human finger, the second finger mount including at least one contact element, the contact element controllably moveable by the second solenoid from a first position to a variable pressure positions; and
 wherein the controller is further configured to control the operation of the second solenoid.

16. The haptic feedback apparatus of claim 15, wherein the controller is configured to, responsive to the input signal:
 generate, based on the input signal, a second solenoid control signal having a second set of characteristics defining a peak stroke of the at least one contact element of the second finger mount and defining a time to peak of the at least one contact element of the second finger mount, the second set of characteristics differing at least in part from the first set of characteristics.

17. The haptic feedback apparatus of claim 14, further comprising a wireless communication circuit configured to receive a message containing the input signal from an external device.

18. The haptic feedback apparatus of claim 17, further comprising an arm mount, wherein the solenoid manifold is supported by the arm mount.

19. A virtual interaction system comprising:
 a haptic feedback apparatus comprising:
  an solenoid manifold a plurality of solenoids, the solenoid manifold configured to be mounted onto a human arm;
  a plurality of finger mounts configured to be mounted onto a corresponding plurality human fingers of a hand, each of the plurality the finger mounts including at least contact element, the contact element controllably moveable by one of the plurality of solenoids from a closed position to an open position;
  a controller configured to receive an input signal, generate, based on the input signal, a plurality of solenoid control signals, and control the operation of the plurality of solenoids using the plurality of solenoid control signals; and a depth camera device configured to detect movement of a human hand and generate corresponding depth image thereof;

a processing circuit operably coupled to receive depth images from the depth camera, the processing circuit configured to generate the input signal based in part on the generated image signals, and wherein the processing circuit is further configured to communicate the input signal to the controller;

the controller signal operates the solenoids to apply the average pressure at the contact element.

20. The virtual interaction system of claim 19, wherein the processing circuit is configured to communicate a sound to the user based on the users interaction parameters with the virtual object.

21. The virtual interaction system of claim 19, wherein the processing circuit is configured to communicate a visual feedback to the user based on the users interaction parameters with the virtual object.

* * * * *